Dec. 16, 1947.   A. F. TURNER ET AL   2,432,950
APPARATUS FOR MAKING OPTICAL WEDGES
Filed Sept. 24, 1943   2 Sheets-Sheet 2

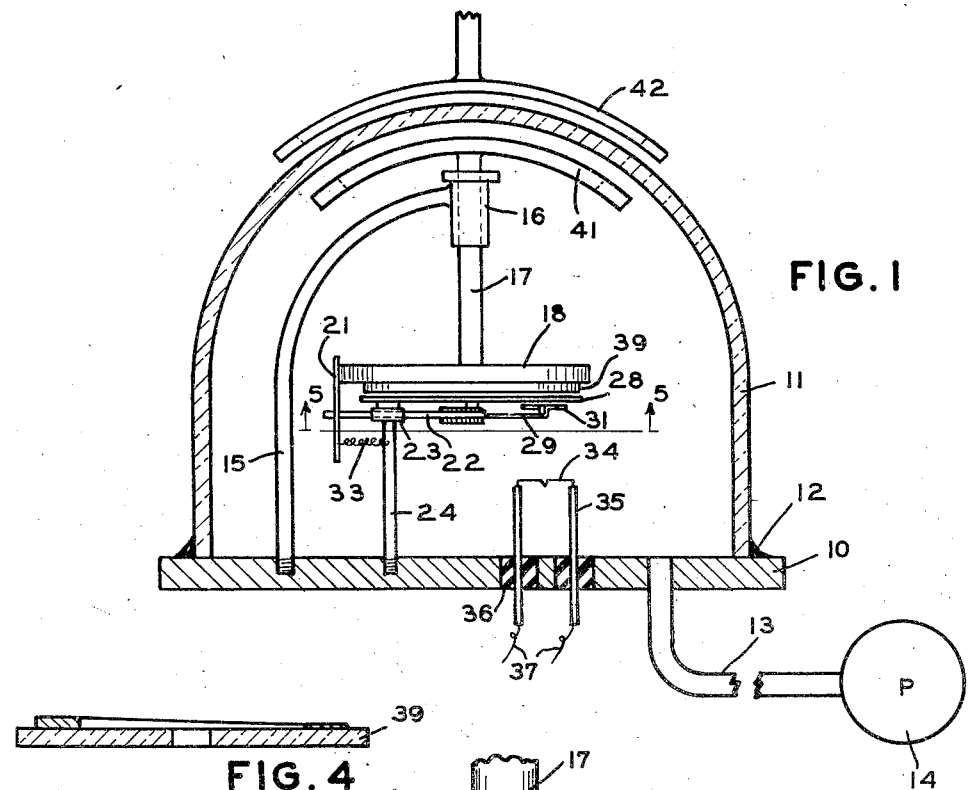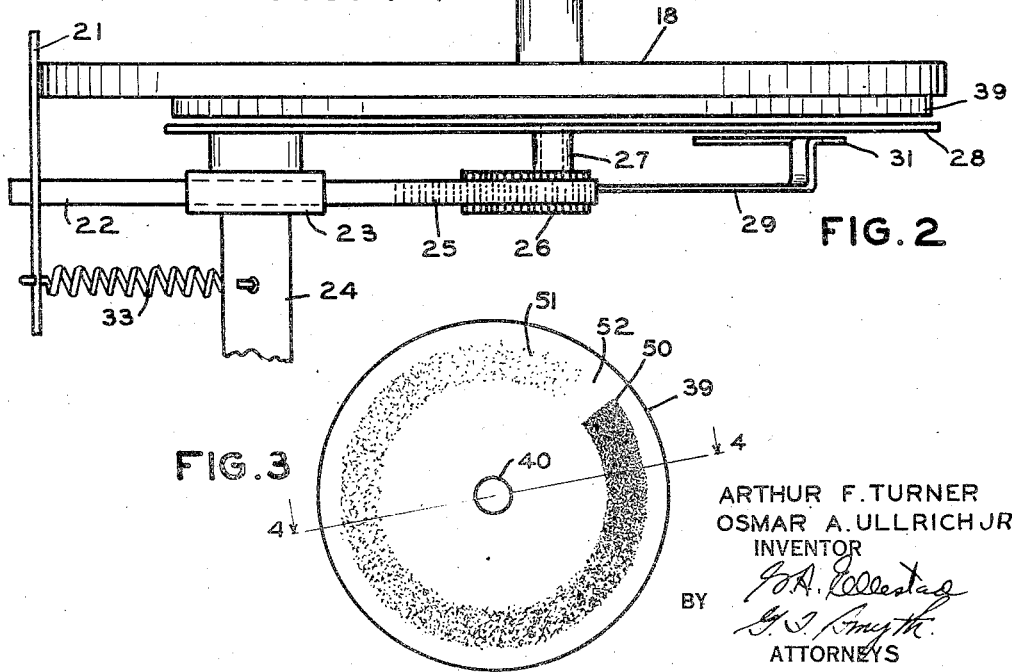

ARTHUR F. TURNER
OSMAR A. ULLRICH JR.
INVENTORS
BY
ATTORNEYS

Patented Dec. 16, 1947

2,432,950

UNITED STATES PATENT OFFICE 2,432,950

APPARATUS FOR MAKING OPTICAL WEDGES

Arthur F. Turner, Brighton, and Osmar A. Ullrich, Jr., Rochester, N. Y., assignors to Bausch & Lomb Optical Company, Rochester, N. Y., a corporation of New York Application September 24, 1943, Serial No. 503,697

10 Claims. (Cl. 91—12.2)

This invention relates to optical elements and the apparatus for and the method of producing the same.

The optical element of the present invention comprises a body of transparent material, having on at least one surface thereof a substantially annular semi-transparent film, the thickness of which varies along any circular arc whose center is coincident with the center of the annular film, but whose thickness is substantially constant in a radial direction. The element may be used in a number of optical instruments for varying intensity of light rays and is especially useful in instruments such as photometers.

The film is formed of a distilled metallic substance, preferably one which is substantially neutral when viewed by transmitted light. In the illustrated embodiment of the present invention, the film is produced by a high vacuum thermal evaporation process, in which the film forming material is vaporized while held adjacent to the film receiving body. A shield interposed between the support and the source of material is provided with an aperture having a shutter cooperating therewith in such a manner that varying amounts of the vaporized material are passed through the aperture and deposited on the body which is rotated relative to the shield to form the desired graduations in thickness in the resulting film.

Although the annular film of the present invention can be formed by merely rotating the body one revolution during the evaporation process, to eliminate unavoidable variations in the rate at which the film-forming material is vaporized and deposited on the film-receiving body, it is now preferred to continually rotate the body relative to the shield during the entire process. This insures that the change in the thickness of the resulting film will be independent of the rate of evaporation of the material.

Annular wedges for varying intensity of light rays have heretofore been formed photographically, but such wedges are objectionable particularly in precision instruments, for the gelatin brings about a distortion of the image. As the support on which the wedge of the present invention is deposited comprises a suitably shaped body of transparent material such as glass, there is no distortion of the image as viewed through the wedge.

Furthermore, a photographically formed wedge as it is made up of dispersed silver particles will scatter light rays. The wedge of the present invention, however, is without this fault for the wedge is a homogeneous film of constantly varying thickness.

Other features and advantages of the present invention will be apparent from the following description taken in connection with the drawing in which:

Fig. 1 is a sectional view partly in elevation of the apparatus of the present invention.

Fig. 2 is an enlarged fragmentary view of a part of the apparatus of the present invention.

Fig. 3 is a top plan view of the element of the present invention.

Fig. 4 is a section taken along line 4—4 of Fig. 3.

Figure 5:
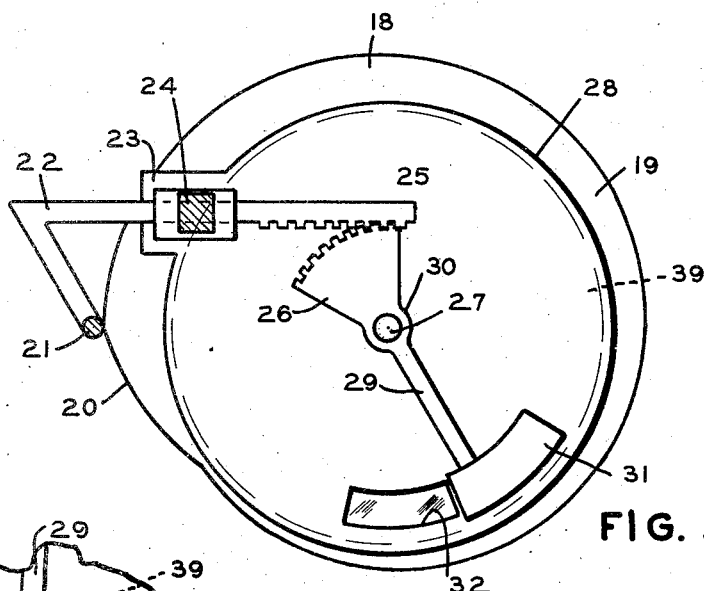
Fig. 5 is a view taken along line 5—5 of Fig. 1 and showing the shield and the actuating mechanism for moving the shutter relative to the aperture formed in the shield.
Figure 7:
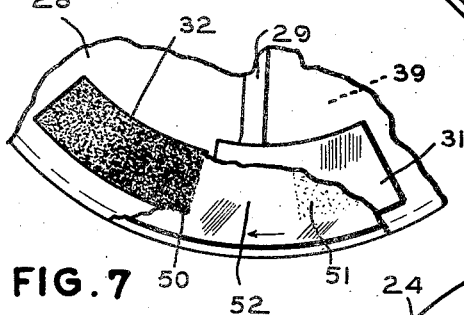
Fig. 7 is a fragmentary view on an enlarged scale of a part of the apparatus as shown in Fig. 5 with portions broken away to more fully illustrate the invention.

The apparatus of the present invention, referring now to the drawing, comprises a suitable base plate 10 which supports an evacuable container, shown here as a bell jar 11 of glass or other material. A vacuum tight seal is formed between the lower edge of the bell jar 11 and the base plate 10 by any suitable sealing means 12. The bell jar is connected by some conventional means such as the pipe 13 to a high vacuum pump shown here diagrammatically at 14.

Figure 6:
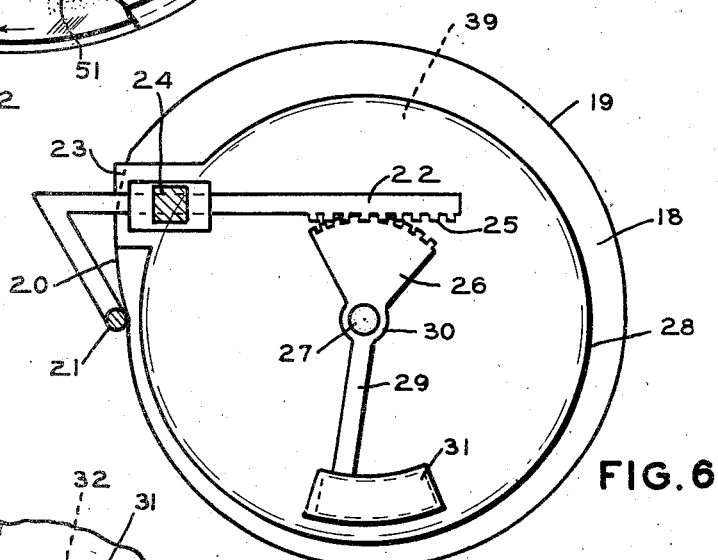
Fig. 6 is a view similar to Fig. 5, but showing the shutter in its aperture-closing position.
Figure 8:
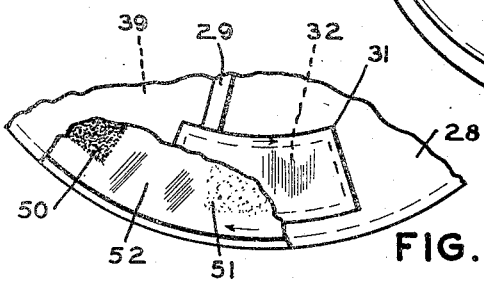
Fig. 8 is a view similar to Fig. 7, but illustrating in a somewhat enlarged scale the relative position of a part of the mechanism as viewed in Fig. 6.

A stanchion 15 having one end secured to the base plate 10 extends upwardly therefrom and carries at the upper end thereof an elongated tubular bearing member 16 rotatably supporting a shaft 17. The lower end of the shaft 17 carries a disc 18 for rotation therewith. The peripheral edge face of the disc 18, as best shown in Figs. 5 and 6, is formed of portions of two Archimedian spirals 19 and 20 which form cam surfaces for actuating a follower 21. The follower 21 comprises a rod-like member secured intermediate the ends thereof to a bar 22 slidably mounted in a bearing block 23 carried by a vertical support 24, the lower end of which is secured to the base plate 10.

The bar 22 at the end opposite to the follower 21 is provided with a plurality of teeth forming a rack 25 engaging the teeth of a sector gear 26.

The gear 26 is rotatably mounted on a stub shaft 27 depending from a shield 28 mounted above the base plate 10 by the support 24. An arm 29, referring now to Fig. 5, formed integral with the hub 30 of the gear 26 carries at the free end thereof a shutter 31 similar in shape to but larger than an aperture 32 formed in the shield 28. A coiled spring 33 having one end secured to the lower end of the follower 21 has the opposite end fixed to the support 24, and it will be seen, referring now to Fig. 2, that the spring 33 will tend to hold the follower 21 in engagement with the peripheral edge face of the cam disc 18 and will tend to urge the rack 25 to the right as viewed in the figure just referred to.

When the disc 18 is rotated, it will be seen that the camming action between the disc and the follower 21 will reciprocally move the bar 22 which causes the shutter 31, through the rack 25 and gear 26, to arcuately move between alternate positions relative to the stub shaft 27. The movement of the shutter 31 covers and uncovers the aperture 32 formed in the shield 28 to control the passage of vapor from a source of vaporizable material through the aperture 32 of the shield 28.

In the illustrated form of the invention, the vaporizable material is held by a heating element 34 carried by current conducting posts 35 supported in bushings 36 of insulated material fitted in apertures formed in the base plate 10. The heating element 34 is connected to a suitable source of current, not illustrated in the drawing, through lead-in conductors 37. It should be noted that the heating element 34 is so mounted on the base plate 10 that it is held directly underneath the aperture 32 of the shield 28.

Although any vaporizable material can be used to form the condensed deposit on the plate, if the resulting element is to be used in an optical instrument, it is preferred to select a material which will form a semi-transparent film substantially neutral when viewed in transmitted light. The material can be formed into U-shaped strips and suspended over the filament or, if desired, it may be placed in a crucible disposed in heat receiving relation with the filament.

In the embodiment of the invention now preferred, the member to receive the film comprises a glass plate 39, shown herein as circular, and mounted to the lower end of the shaft 17 and held against the lower side of the cam disc 18 through a suitable fastening element passing through a centrally located aperture 40 formed in the plate and fixed to the shaft. The shield 28 should be so mounted relative to the plate that the lower surface of the latter will be parallel to the shield and closely spaced therefrom.

It should now be understood that rotation of the shaft 17 will rotate the plate 39. Although any means desired may be used for rotating the shaft 17, in the illustrated embodiment of the invention, this is accomplished by means of a magnet 41 secured to the upper end of the shaft 17. A second magnet 42 mounted exteriorly of the bell jar 11 and rotated through some suitable power source such as a motor will, because of the magnetic attraction, cause the magnet 41 to rotate at the same speed as the magnet 42 is rotated. A mass of magnetic material may replace the magnet 41, but it has been found that the weight and mass of this member can be reduced if a magnet is used rather than a metal bar.

It will be seen that if the shutter were not used, the film deposited on the lower surface of the plate 39 as it rotated would be in the form of an annulus of uniform thickness. As the shutter controls the passage of the vapor through the aperture, the area and thickness of film deposited on the lower surface of the plate 39 will depend on the shape of the aperture 32 and the movement of the shutter 31. The aperture 32, as best illustrated in Fig. 5, is an annular or zonal segment and the shutter is of a similar shape but larger in size.

Movement of the shutter as heretofore explained is controlled by the shape of the cam surfaces formed by the edge face of the disc 18. In the illustrated embodiment of the present invention, the cam surfaces are so formed and the size of the shutter is such relative to the size of the opening, that the resulting film, referring now to Fig. 3, will comprise a substantially complete annulus having a maximum thickness at 50 which gradually decreases in a clockwise direction as viewed in Fig. 3 to a minimum thickness at 51, and spaced from the area 50 of maximum thickness by a clear or unfilmed area 52.

In carrying out the method of the present invention, after the film-forming material has been placed on the filament 34 and the bell jar 11 evacuated, the magnet 42 is rotated at a constant speed to cause the disc 18 and the film receiving plate 39 to revolve about an axis coincident with the longitudinal axis of the shaft 17. Rotation of the disc 18, as will now be understood, reciprocally moves the shutter across the aperture 32. In the illustrated embodiment of the present invention, this reciprocal movement is not uniform due to the particular formation of the cam surfaces 19 and 20.

When the disc 18 and follower 21 are in the relative position as shown by Fig. 5, that is, when the follower 21 is in engagement with the high point of the cam 19, the aperture is not covered by the shutter. Thus particles of the vaporized material will pass upwardly through the aperture 32 and adhere to the under surface of the rotating plate 39.

The disc 18 is rotated clockwise as viewed in Fig. 5 and continued rotation of the disc 18 will bring the cam surface 20 into engagement with the follower 21 as the spring 33 continually urges the follower against the cam surfaces of the disc. The relative movement of the follower along the surface 20, to the position illustrated by Fig. 6, will, through the movement of the rack 25, rotate the gear 26 and move the shutter 31 across the aperture 32, in the same rotational direction as the plate 39 is moving, to prevent the passage therethrough of the vaporized material.

As the disc 18 continues to rotate, the follower will be urged to the left by the cam 19 and the corresponding movement of the rack to the left as viewed in Fig. 5 will cause the shutter to slowly move in a direction opposite to the direction of rotation of the film-receiving plate 39 until the follower 21 again is engaging the high point of the cam 19 and the aperture is again uncovered. Thus it will be seen that, with each rotation of the film-receiving plate 39, the shutter will be quickly moved from the position shown in Fig. 5 to that shown in Fig. 6 and then slowly moved back until the aperture is again open.

The cam surfaces 19 and 20 have been shown as of the size and shape necessary to produce the annular wedge shown in Fig. 3. The cam surface 20 is such that the shutter 31 will move into its closing position at the same speed as well as in the same direction as the plate 39 is rotatably moved. Thus, it will be seen that the portion of the annular area on plate 39 just ahead of the leading edge of the shutter in the closing motion thereof will be exposed to the vapor the entire length of the aperture. It should now be obvious that this portion will receive the greatest amount of vaporized material and that this portion is the maximum thickness end 50 of the wedge.

The portion of the area of the member 39 which is disposed just behind the leading edge of the shutter in the closing motion thereof will be screened or shielded from the vapor as it moves past the aperture and, consequently, will not receive any film. As the shutter is actually larger than the aperture and the leading edge thereof in the closing movement of the same moves past the left hand edge of the aperture as viewed in Fig. 6, the portion of the annular area of the member 39 which has moved under the shield before the shutter has moved in its opening movement a distance sufficient to again uncover the left hand edge of the aperture will also receive no film. Thus, it will be seen that the area of the clear or unfilmed portion will, in the form of the invention illustrated, depend in part on the relative sizes of the shutter 31 and aperture 32 and whether or not the leading edge of the shutter in the closing motion moves past the left hand edge of the aperture 32.

As soon as the trailing edge of the shutter 31 in the opening movement thereof clears the left hand edge of the aperture as viewed in Fig. 5, a portion of the annular area of the plate 39 will be exposed to the vapor as it moves past the aperture. The amount of vapor condensing in this portion of the annular area of the plate 39 will, due to the position of the shutter relative to the aperture, be small, and it will be understood now that the vapor condensing on this portion forms the minimum thickness portion 51 of the wedge.

As the shutter continues its return motion and progressively enlarges the aperture, the lower surface of the plate 39 will be exposed for a longer period to the vapor rising from the source of film forming material and consequently the thickness of the resulting film will progressively increase until the shutter completes its return or opening motion and reverses its path of movement and again moves across the aperture to obstruct the passage of vapor therethrough.

It should be understood now that any arcuately curved graduated film can be deposited on the lower surface of the plate 39 by merely changing the size and shape of the cam surfaces formed on the edge face of the disc 18, as well as the size and shape of the aperture and the shutter which closes the same.

The deposit on the plate 39 resulting from the method and the apparatus just described will gradually vary in thickness from the minimum portion 51 around the annular segment to the maximum at 50; that is, the deposit is graduated along any circular arc whose center is coincident with the axis of rotation of the plate 39. The deposit, however, will be constant in thickness when viewed in any one radial section as clearly shown in Fig. 4. Therefore, the optical density of the annular film, when viewed by transmitted light, will be constant along any radius of the annular segment but will vary circumferentially around the annular area on which the film is deposited.

While the present preferred embodiment of the invention has been illustrated and described here, it is to be understood that the invention is not limited thereby, but is susceptible to changes of form and detail within the scope of the appended claims.

We claim:

1. An apparatus of the type described comprising an evacuable container; means for evacuating said container; a film-receiving member rotatably mounted within said container; means for causing vapors from a source of film-forming material to travel toward said member; a shield intermediate said source and member, said shield having an aperture therein; means for rotating said member; and means for opening and closing said aperture once for each rotation of the member whereby the amount of said vapor passing through said aperture and condensing on said member will vary around the annular area of the member coated with said condensed vapors.

2. An apparatus of the type described comprising an evacuable container; means for evacuating said container; a film-receiving member rotatably mounted within said container; a shield larger in area than said member and concentrically mounted adjacent thereto, said shield having an aperture therein; a source of film-forming material; means for heating said material to cause vapors thereof to travel toward said shield and through the aperture therein, the vapors passing through said aperture condensing on a surface of said member; means for rotating said member; and means for opening and closing said aperture once for each rotation of the member whereby the amount of said vapor condensing on the said surface will vary around the annular area thereof coated with said condensed vapor.

3. An apparatus of the type described comprising an evacuable container; means for evacuating said container; a film-receiving member mounted in said container; means for vaporizing the film-forming material in such a manner that the vaporized material will tend to travel toward said member and condense on a surface thereof; a shield interposed between the member and said vaporizing means, said shield being of such a size and shape relative to the size and shape of said member that the same screens said member from said vaporized material, said shield having an aperture therein, said aperture exposing a portion of a surface of said member to said vaporized material; means for relatively rotating said shield and member; and means for opening and closing said aperture at each relative rotation of said shield and member whereby an annular film of condensed vaporized material having a graduated thickness is formed on the one surface of said member.

4. An apparatus of the type described comprising an evacuable container; means for evacuating said container; a film-receiving member mounted in said container; means for vaporizing the film-forming material in such a manner that the vaporized material will tend to travel toward said member and condense on a surface thereof; a shield interposed between the member and said vaporizing means, said shield being of such a size and shape relative to the size and shape of said member that the same screens said member from said vaporized material, said shield having an aperture therein in the shape of a segment of an annulus, said aperture exposing a portion of a surface of said member to said vaporized material; means for relatively rotating said shield and member; a shutter; and means for moving said shutter for blocking and unblocking said aperture at each relative rotation of said shield and member whereby an annular film of condensed vaporized material having a graduated thickness is formed on the one surface of said member.

5. An apparatus of the type described comprising an evacuable container; means for evacuating said container; a film-receiving member mounted in said container; means for vaporizing the film-forming material in such a manner that the vaporized material will tend to travel toward said member and condense on a surface thereof; a shield interposed between the member and said vaporizing means, said shield being of such a size and shape relative to the size and shape of said member that the same screens said member from said vaporized material, said shield having an aperture therein, said aperture exposing a portion of a surface of said member to said vaporized material; means for relatively rotating said shield and member; and means for quickly closing said aperture and slowly opening the same at each relative revolution of said member and shield whereby an annular film of condensed vaporized material having a graduated thickness is formed on the one surface of said member.

6. An apparatus of the type described comprising an evacuable container; means for evacuating said container; a film-receiving member mounted in said container; means for vaporizing the film-forming material in such a manner that the vaporized material will tend to travel toward said member and condense on a surface thereof; a shield interposed between the member and said vaporizing means, said shield being of such a size and shape relative to the size and shape of said member that the same screens said member from said vaporized material, said shield having an aperture therein, said aperture exposing a portion of a surface of said member to said vaporized material; means for rotating said member; a shutter mounted for movement in a plane intermediate said shield and said vaporizing means; and means actuated by rotation of said member for reciprocally moving said shutter to cover and uncover said aperture at each rotation of said member.

7. An apparatus of the type described comprising an evacuable container; means for evacuating said container; a film-receiving member mounted in said container; means for vaporizing the film-forming material in such a manner that the vaporized material will tend to travel toward said member and condense on a surface thereof; a shield interposed between the member and said vaporizing means, said shield being of such a size and shape relative to the size and shape of said member that the same screens said member from said vaporized material, said shield having an aperture therein, said aperture exposing a portion of a surface of said member to said vaporized material; means for rotating said member; a shutter mounted for movement in a plane intermediate said shield and said vaporizing means; cam means mounted for rotational movement with said member; follower means in engagement with said cam means; and means actuated by movement of said follower means for reciprocally moving said shutter to cover and uncover said aperture at each rotation of said member.

8. An apparatus of the type described comprising an evacuable container; means for evacuating said container; a film-receiving member mounted in said container; means for rotating said member; means for vaporizing the film-forming material in such a manner that the vaporized material will tend to travel toward said member and condense on a surface thereof; a shield interposed between the member and said vaporizing means; said shield being of such a size and shape relative to the size and shape of said member that the same screens said member from said vaporized material, said shield having an aperture therein, shaped as a zonal segment whose center is coincident with the axis of rotation of said film-receiving member, said aperture exposing an annular portion of a surface of said member to said vaporized material; a shutter larger than but similar in shape to said aperture movably mounted intermediate said shield and said vaporizing means; and means including means actuated by said rotating means for reciprocally moving said shutter to block and unblock said aperture at each rotation of said member whereby variant amounts of said vaporized material will pass through said aperture and condense on said member, the film resulting from said condensed material varying in thickness along circular arcs whose centers are coincident with the axis of rotation of said member.

9. An apparatus of the type described comprising an evacuable container, means for vaporizing a film-forming material within the container, a film-receiving member rotatably mounted above said means, a shield mounted between said means and member, said shield having an aperture through which vapors of film-forming material may pass to the member, means for rotating said member, a shutter movably mounted to block and unblock said aperture, and means for moving the shutter through one blocking and unblocking cycle for each rotation of the member.

10. An apparatus of the type described comprising an evacuable container, means for vaporizing a film-forming material within the container, a film-receiving member rotatably mounted above said means, a shield mounted between said means and member, said shield having an aperture through which vapors of film-forming material may pass to the member, means for rotating said member, a shutter movably mounted to block and unblock said aperture, and means for moving the shutter through one blocking and unblocking cycle for each rotation of the member, said last-named means comprising cam means mounted to rotate with said member, a follower coacting with said cam means and means actuated by the follower for swinging the shutter means back and forth in an arcuate path to block and unblock said aperture.

ARTHUR F. TURNER.
OSMAR A. ULLRICH.

REFERENCES CITED

The following references are of record in the file of this patent:

UNITED STATES PATENTS

| Number | Name | Date |
|---|---|---|
| 767,216 | Edison | Aug. 9, 1904 |
| 2,160,981 | O'Brien | June 6, 1939 |
| 2,259,395 | Sachtleben | Oct. 14, 1941 |
| 2,263,008 | McRae | Nov. 18, 1941 |
| 2,301,456 | Sabine | Nov. 10, 1942 |
| 2,331,027 | Harrison | Oct. 5, 1943 |
| 2,341,827 | Sukumlyn | Feb. 15, 1944 |